US009470355B2

(12) United States Patent
Litzenburger

(10) Patent No.: US 9,470,355 B2
(45) Date of Patent: Oct. 18, 2016

(54) METHOD FOR PRODUCING A TUBE OR SEMI-FINISHED TUBE AND TUBE OR SEMI-FINISHED TUBE FOR CHEMICAL APPARATUS CONSTRUCTION

(75) Inventor: Achim Litzenburger, Fischbach/Nahe (DE)

(73) Assignee: SIMONA AG, Kirn (DE)

( * ) Notice: Subject to any disclaimer, the term of this patent is extended or adjusted under 35 U.S.C. 154(b) by 259 days.

(21) Appl. No.: 14/116,712

(22) PCT Filed: Apr. 27, 2012

(86) PCT No.: PCT/EP2012/057823
§ 371 (c)(1),
(2), (4) Date: Nov. 8, 2013

(87) PCT Pub. No.: WO2012/152605
PCT Pub. Date: Nov. 15, 2012

(65) Prior Publication Data

US 2014/0076452 A1 Mar. 20, 2014

(30) Foreign Application Priority Data

May 12, 2011 (DE) ........................ 10 2011 075 745

(51) Int. Cl.
*F16L 9/14* (2006.01)
*F16L 58/10* (2006.01)
(Continued)

(52) U.S. Cl.
CPC ................ *F16L 58/10* (2013.01); *B29C 63/10* (2013.01); *B29C 65/10* (2013.01);
(Continued)

(58) Field of Classification Search
USPC ................................ 138/125, 129, 137, 142
See application file for complete search history.

(56) References Cited

U.S. PATENT DOCUMENTS 3,723,234 A 3/1973 MacDonald
3,934,064 A * 1/1976 Lowthian .............. B29C 51/145
138/124

(Continued)

FOREIGN PATENT DOCUMENTS

CN 2486806 Y 4/2002
DE 26 55 597 A1 6/1977

(Continued)

OTHER PUBLICATIONS

International Preliminary Report on Patentability for corresponding International Application No. PCT/EP2012/057823 mailed on Nov. 21, 2013.

(Continued)

*Primary Examiner* — James Hook
(74) *Attorney, Agent, or Firm* — Billion & Armitage; Benjamin Armitage

(57) ABSTRACT

The invention relates to a tube (01) or semi-finished tube, in particular for chemical apparatus construction, for storing or for transporting aggressive storage media, comprising a solid inner tube (02) with the inner side (05) of which the storage medium can come into contact and which is made of a thermoplastic that is chemically resistant to the storage medium, and comprising an adhesion-promoting layer (03) applied to the outer side (09) of the inner tube (02), which has a textile structure and is made of a thermoplastic, the textile structure of the adhesion-promoting layer (03) being suitable for mounting a support tube (04) on the outer side of the adhesion-promoting layer (03), the outer side of the inner tube (02) and the inner side of the adhesion-promoting layer (03) being welded together in a material-bonded manner, the textile structure being preserved on the outer side of the adhesion-promoting layer (03).

7 Claims, 3 Drawing Sheets

(51) Int. Cl.

| | |
|---|---|
| ***B29C 63/10*** | (2006.01) |
| ***F16L 9/12*** | (2006.01) |
| ***B29C 65/10*** | (2006.01) |
| ***B29C 65/48*** | (2006.01) |
| ***B29C 65/50*** | (2006.01) |
| ***B29C 65/00*** | (2006.01) |
| ***B29D 23/00*** | (2006.01) |
| ***B32B 1/08*** | (2006.01) |
| *B29C 53/64* | (2006.01) |
| *B29C 63/00* | (2006.01) |
| *B29C 65/02* | (2006.01) |
| *B29L 23/00* | (2006.01) |
| *B29C 65/14* | (2006.01) |

(52) U.S. Cl.

CPC ...... *B29C 65/4815* (2013.01); *B29C 65/5028* (2013.01); *B29C 65/5057* (2013.01); *B29C 66/52272* (2013.01); *B29C 66/723* (2013.01); *B29C 66/73921* (2013.01); *B29D 23/001* (2013.01); *B32B 1/08* (2013.01); *F16L 9/123* (2013.01); *B29C 53/64* (2013.01); *B29C 63/0069* (2013.01); *B29C 65/02* (2013.01); *B29C 65/14* (2013.01); *B29C 65/5092* (2013.01); *B29C 66/5229* (2013.01); *B29C 66/71* (2013.01); *B29C 66/729* (2013.01); *B29C 66/7212* (2013.01); *B29L 2023/225* (2013.01); *Y10T 156/10* (2015.01)

(56) References Cited

U.S. PATENT DOCUMENTS 4,104,095 A * 8/1978 Shaw ...................... B29C 70/82 138/125
4,347,090 A * 8/1982 Anderson ............. B29B 13/024 138/125
RE31,047 E * 10/1982 Ross ..................... F16L 11/088 138/103
4,357,962 A * 11/1982 Shaw ...................... F16L 9/121 138/124
4,447,378 A * 5/1984 Gray ..................... B29C 44/324 138/125
5,129,979 A 7/1992 Nakayama et al.
5,671,780 A 9/1997 Kertesz
2002/0100516 A1* 8/2002 Powell .................. F16L 11/082 138/125
2003/0140978 A1* 7/2003 Troschitz .............. B29C 70/086 138/125
2004/0134555 A1 7/2004 Powell et al.
2008/0023860 A1 1/2008 Dehennau et al.
2010/0032047 A1* 2/2010 Mennig ................. F16L 11/085 138/125
2012/0291903 A1* 11/2012 Ekelund ................ B29C 53/805 138/97

FOREIGN PATENT DOCUMENTS

DE 10 2007 041 678 A1 3/2009
EP 0 577 134 B1 1/1994
GB 1 561 430 2/1980

OTHER PUBLICATIONS

International Search Report for corresponding International Application No. PCT/EP2012/057823 mailed on Jul. 16, 2012.
Office Action for corresponding Chinese Application No. 201280022510.8 mailed on Aug. 29, 2014.

* cited by examiner

METHOD FOR PRODUCING A TUBE OR SEMI-FINISHED TUBE AND TUBE OR SEMI-FINISHED TUBE FOR CHEMICAL APPARATUS CONSTRUCTION

This application is a National Stage Application of PCT/EP2012/057823, filed on 27 Apr. 2012, which claims benefit of Application No. 10 2011 075 745.7, filed on 12 May 2011 in Germany and which applications are incorporated herein by reference. A claim of priority to all, to the extent appropriate, is made.

FIELD OF INVENTION

The invention relates to a method for producing a tube or a semi-finished tube, in particular for chemical apparatus construction, according to the preamble of claim 1.

Further, the invention relates to a tube or semi-finished tube which can be used, in particular in chemical apparatus construction, for storing or for transporting aggressive storage media.

BACKGROUND

Generic components for chemical apparatus construction are known from EP 0 577 134 B1 and from U.S. Pat. No. 3,723,234. The components described there, which in particular can also be tubes, have a multi-layered structure. There, the inner layer is formed by a thermoplastic that is chemically resistant to the storage medium to be received. The properties of the thermoplastic, which in the generic tubes and semi-finished tubes forms a solid inner tube, can be specifically configured to include resistance to the storage medium coming into contact with the inner side. Due to their inherent structure, however, said thermoplastic inner tubes are only insufficiently stable from a mechanical point of view.

SUMMARY

Therefore, it is generically provided that an adhesion-promoting layer having an in particular sheet-like textile structure is applied to the outer side of the inner tubes. For example, said adhesion-promoting layer can be a crocheted, woven or knitted glass fiber element with a textile structure. Said textile structure can have the form of a textile strip or of a textile hose. The adhesion-promoting layer has the task of allowing the mounting of a support tube that completely encloses the inner tube. By means of the adhesion-promoting layer, an adhesion between the inner tube and the outer support tube is realized, which is strong enough for the chemically resistant inner tube to be sufficiently supported by the mechanically high-strength support tube.

In other words, this means that the generic tubes have a multi-layered structure whose solid inner layer is resistant to the respectively present chemical aggressions, such as by aggressive chemical substances, while the adhesion-promoting layer provides the necessary adhesion between the inert or resistant solid inner layer and the outer carrier material. As far as semi-finished tubes are concerned, said semi-finished tubes initially only comprise the solid inner tube and the adhesion-promoting layer applied thereto. Said semi-finished tubes can then be completed by the respective user mounting the outer support tube.

In production of the tubes or semi-finished tubes known from the state of the art, after the extrusion of the thermoplastic inner tube, the outer side of the inner tube is heated and the adhesion-promoting layer is applied to the softened outer side of the inner tube. Due to the plasticity of the outer side of the inner tube, the textile structure of the adhesion-promoting layer is embedded into the thermoplastic inner tube and is mechanically wedged there. As a result, a form fit between the material of the inner tube and the textile adhesion-promoting layer is created. This form-fitting connection between the adhesion-promoting layer and the inner tube has the disadvantage that, depending on the respective material pairing, delaminating effects can occur relatively easily. For instance, if the plasticized part of the inner tube does not penetrate deeply enough into the textile structure of the adhesion-promoting layer, the adhesion-promoting layer can easily become detached on the boundary to the inner tube, and thus damage to the entire tube can occur. If the strips of the adhesion-promoting layer overlap in the edge portions, detachment processes may be accelerated.

All composite components with a closed cross section shall be considered to be tubes or semi-finished tubes in the sense of the invention. In particular, fittings for the production of tube connections are also tubes in the sense of the invention.

Therefore, it is the object of the present invention to propose a method for producing a tube or semi-finished tube for chemical apparatus construction which has an increased delamination resistance in the boundary layer between the adhesion-promoting layer and the inner tube. Further, it is the object of the present invention to propose a tube or semi-finished tube that can be produced in particular by means of the method of the invention.

Said objects are attained by a method and by a tube or semi-finished tube according to the teaching of the independent main claims.

The method according to the invention is based on the fundamental idea that both the solid inner tube and the adhesion-promoting layer applied thereto are produced from a meltable thermoplastic, in particular one of the same type or of the same polymer. In production of the connection between the inner tube and the adhesion-promoting layer, the material of the inner tube and also the material of the adhesion-promoting layer are partially melted. In the course of this, however, both the textile structure of the adhesion-promoting layer and the tube structure of the inner tube have to be at least partially preserved. The adhesion-promoting layer and the inner tube are then brought into contact in the melting zone and are welded to each other in a material-bonded manner. Potentially overlapping bands of the adhesion-promoting layer are also penetrated by the molten material of the inner tube and are welded. By means of the material-bonded connection, a very high delamination resistance between the adhesion-promoting layer and the inner tube is achieved.

In order to melt the outer side of the inner tube and the inner side of the adhesion-promoting layer, according to a first method variation, at least one heating device may be provided, by means of which the two parts, respectively, are heated directly and are also partially melted together. As a result, two separate melting zones are created, which are then brought into contact with each other and are thus welded together.

According to a second, alternative method variation, first, only the outer side of the inner tube is heated by means of a heating device and is melted. The degree of heating and the amount of material melted on the inner tube therein has to be chosen such that during the subsequent contacting of the initially non-molten adhesion-promoting layer, a part of the material of the adhesion-promoting layer is also partially melted due to the contact with the melting zone of the inner tube owing to heat transmission from the thermoplastic of the inner tube and then becomes welded with the inner tube. This means that, according to the second method variation, only the inner tube is heated and melted directly whereas the adhesion-promoting layer is heated and melted indirectly by the contact with the melting zone of the inner tube.

The method according to the invention can be implemented especially easily and inexpensively if the outer side of the inner tube is heated beyond the melting point in a pre-heating device and then the material of the adhesion-promoting layer is applied to the heated melting zone on the outer side of the inner tube.

In this context, it is particularly cost-effective if the adhesion-promoting layer is produced from a textile material strip. Said textile material strip can then be wound in a spiral shape onto the heated melting zone on the outer side of the inner tube and can thus form a tubular adhesion-promoting layer on the outer side of the inner tube.

In the alternative, the adhesion-promoting layer can be formed by covering the heated melting zone on the outer side of the inner tube with a textile material hose so that no butt weld is formed.

The method according to the invention requires an exact control of the heating process on the outer side of the inner tube and/or on the inner side of the adhesion-promoting layer. This precisely targeted heating of the material can be realized in a particularly simple manner in that the heating takes place by supplying hot air or heat radiation. In the alternative, heating by means of an open flame is possible as well.

The implementation of the method according to the invention is facilitated if the inner tube comprises at least two different material layers which have been coextruded. The inner layer of the inner tube can then be specifically configured for the requirements with regard to the contact with the storage material, while the outer layer of the inner tube can be specifically modified with regard to the welding to the adhesion-promoting layer.

According to a preferred variation, it is envisaged that the thermoplastic of the outer material layer on the inner tube has a lower viscosity or a lower melting range than the thermoplastic of the inner material layer on the inner tube. Said lower viscosity or said lower melting range allows the outer material layer of the inner tube to melt at a relatively low temperature. An undesired excess melting of the inner tube is reliably precluded by the higher viscosity on the inner material layer of the inner tube.

The inner tube and the adhesion-promoting layer can be melted together particularly easily and with mechanically high strength if both the inner tube and the adhesion-promoting layer are produced from a thermoplastic of the same type. According to a preferred variation, the inner tube and the adhesion-promoting layer are therefore produced from polyolefins of the same type, respectively, in particular from polypropylene. Also, partly or fully fluorinated plastics are particularly suitable.

The tube or semi-finished tube according to the invention, in which the outer support tube still must be additionally mounted, as opposed to the tube of the invention, is characterized by the welding of the thermoplastics on the outer side of the inner tube and the inner side of the adhesion promoting-layer. On the outer side of the adhesion-promoting layer, the textile structure has to be preserved in order to ensure an adhesion of the support tube to the outer side of the adhesion-promoting layer.

The adhesion-promoting layer itself should preferably have a three-dimensional textile structure.

The textile structure of the adhesion-promoting layer can be formed in the manner of a woven, crocheted or knitted structure.

DESCRIPTION OF THE DRAWINGS

Different aspects of the invention are schematically illustrated in the drawing and will be exemplarily explained in the following.

DETAILED DESCRIPTION

Figure 1:
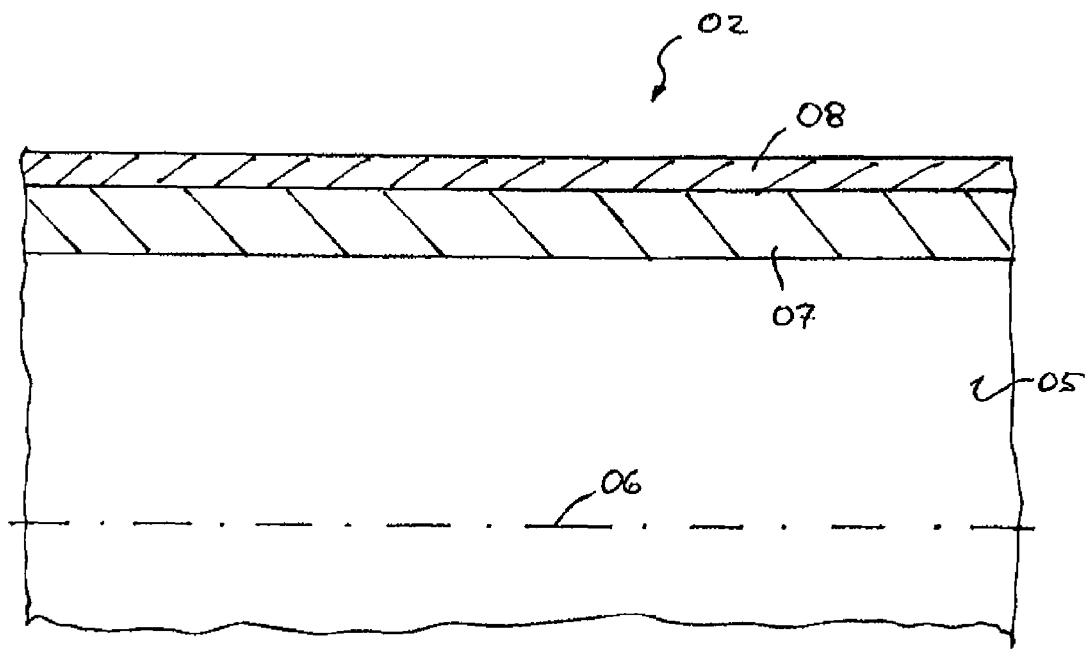
FIG. 1 shows a two-layered inner tube comprising an outer layer that is coextruded onto an inner layer.

FIG. 1 to FIG. 5 show, in a schematic exemplary form, the production of a tube 01 (see FIG. 5) comprising a solid inner tube 02, a textile adhesion-promoting layer 03 and an outer support tube 04. If a tube 01 of this sort is to be used in apparatus construction for storing or for transporting aggressive chemical substances, in particular strong acids, then the inner tube 02 is produced from a thermoplastic that is chemically resistant to the aggression of the storage media coming into contact with the inner side 05. In the drawing according to FIG. 1 to FIG. 5, the different tubes are illustrated only in the upper half, i.e. each of the tubes is formed circularly symmetric to the middle axis 06.

The starting point for producing the tube 01 is a coextruded inner tube 02 as illustrated in FIG. 1. The inner tube 02 comprises an inner layer 07 and an outer layer 08 and is produced by coextruding two thermoplastics. The material of the inner layer 07 is specified in terms of the material having a high chemical resistance to the storage media on the inner side 05. The thermoplastic material for forming the outer layer 08, on the other hand, has a viscosity as low as possible so that this material can be melted and welded particularly well. In the boundary layer between the inner layer 07 and the outer layer 08, of course the two materials have to be compatible in order to avoid delaminating effects.

Figure 2:
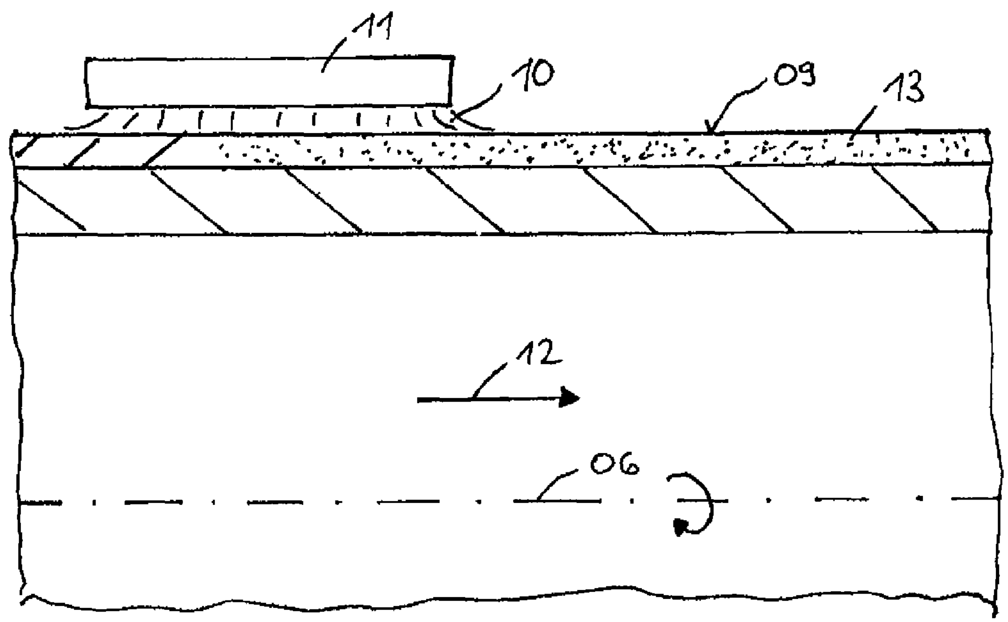
FIG. 2 shows the inner tube according to FIG. 1 during the heating and melting of the outer layer.

As illustrated in FIG. 2, the outer side 09 of the rotating inner tube 02 is heated by exposure to hot air 10 from a hot air nozzle 11. The material of the outer layer 08 is at least partially melted. To realize a uniform melting of the outer layer 08, the inner tube 02 rotates and is simultaneously pulled axially in the direction of the motion arrow 12. By heating the outer side 09 with hot air 10, a melting zone 13 is formed.

Figure 3:
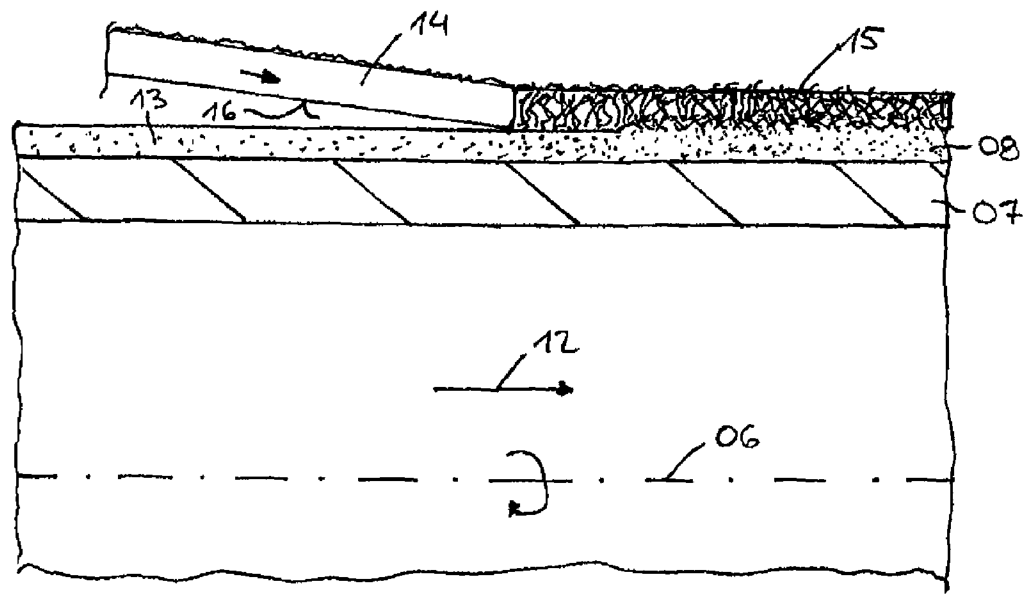
FIG. 3 shows the application of a textile adhesion-promoting layer onto the inner tube according to FIG. 2 molten on the outer side.

FIG. 3 shows the inner tube 02 during the application of a textile material strip 14 to the melting zone 13 for forming the adhesion-promoting layer 15. By rotating and simultaneously axially pulling the inner tube 02 in the direction of the motion arrow 12, the textile material strip 14 is wound spirally onto the circumference of the inner tube 13 and thus forms a cylindrical structure enclosing the inner tube 02 from all sides. By means of the process heat contained in the melting zone 13, the inner side 16 of the material strip 14 is partially melted upon contact with the melting zone 13 and is welded with the thermoplastic of the outer layer 08 in a material-bonded manner.

Figure 4:
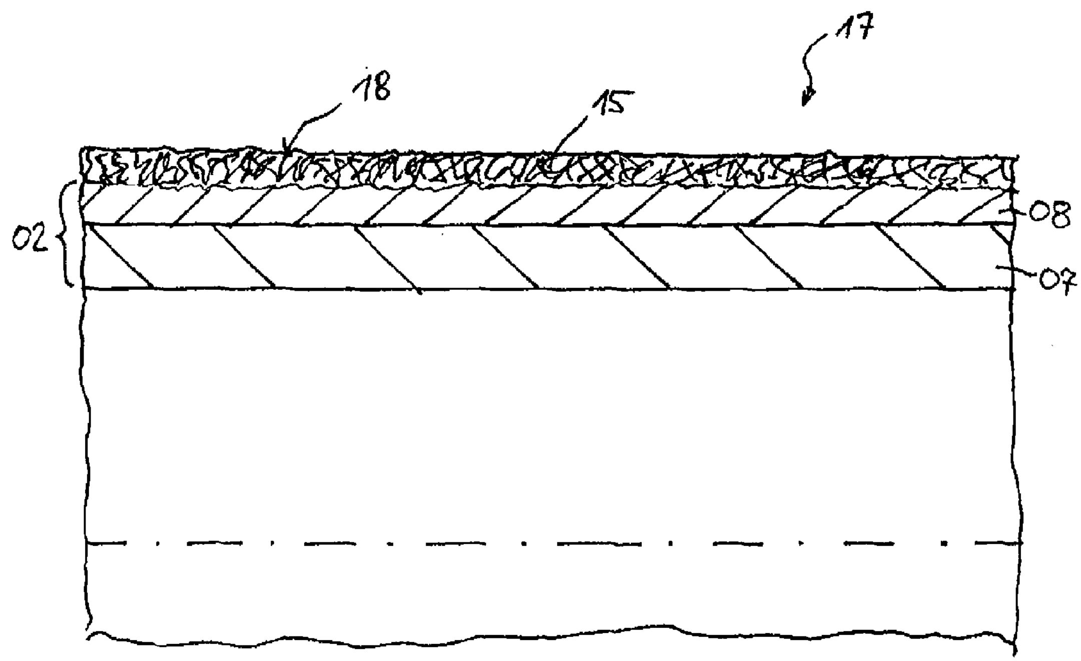
FIG. 4 shows the semi-finished tube comprising a solid inner tube and a textile adhesion-promoting layer applied to the outer side after the inner tube according to FIG. 3 has cooled down.

FIG. 4 shows the semi-finished tube 17, produced by applying the adhesion-promoting layer 15 on the inner tube 02, after the thermoplastics in the melting zone 13 have solidified. The inner side 16 of the adhesion-promoting layer 15 and the outer side 09 of the outer layer 08 are welded together in a material-bonded manner. The melting of the adhesion-promoting layer 15 is limited to an inner zone so that the textile structure on the outer side 18 of the adhesion-promoting layer 15 is preserved.

Figure 5:
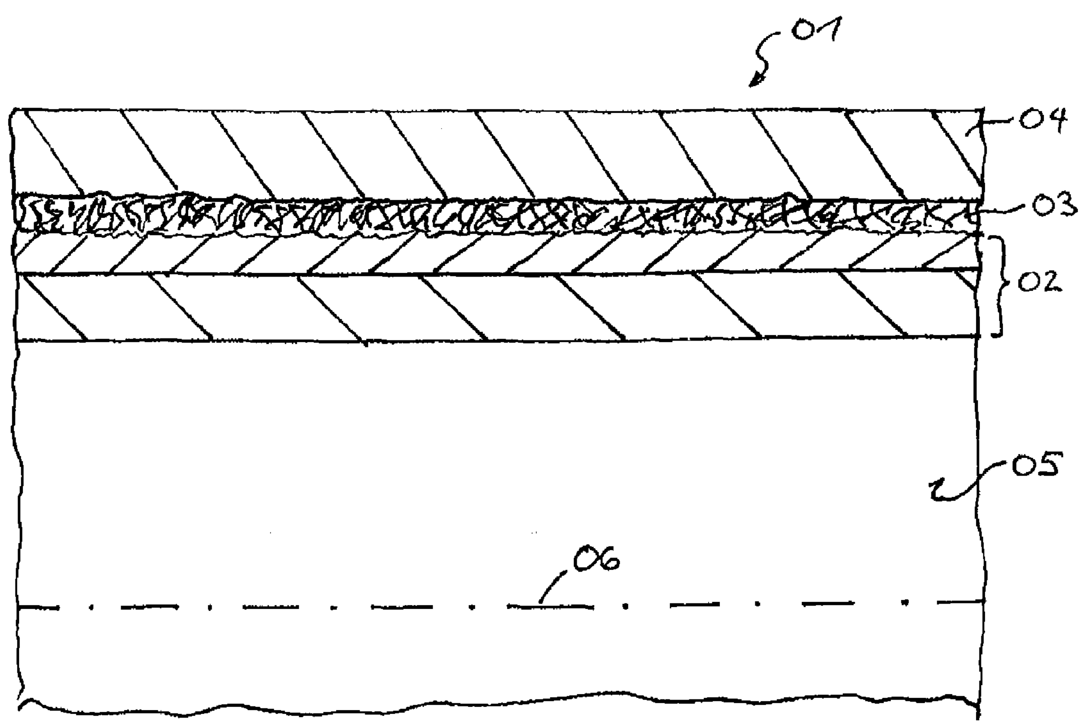
FIG. 5 shows the semi-finished tube according to FIG. 4 after an outer support tube has been mounted.

FIG. 5 shows how, in a last step, a tube 01 is produced from the semi-finished tube 17 by mounting the support tube 04. The support tube 04 serves in particular for the mechanical rigidity of the tube 01 and can for example be laminated thereon from a glass fiber-reinforced resin.

The invention claimed is:

1. A tube or semi-finished tube, in particular for chemical apparatus construction, for storing or for transporting aggressive storage media, comprising a solid inner tube with the inner side of which the storage medium can come into contact and which is made of a thermoplastic that is chemically resistant to the storage medium, and comprising an adhesion-promoting layer applied to the outer side of the inner tube, which has a textile structure and is made of a thermoplastic, the textile structure of the adhesion-promoting layer being suitable for mounting a support tube on the outer side of the adhesion-promoting layer, wherein the outer side of the inner tube and the inner side of the adhesion-promoting layer are welded together in a material-bonded manner, the textile structure being preserved on the outer side of the adhesion-promoting layer, wherein the adhesion-promoting layer is formed by a textile material strip that is wound or rolled onto the outer side of the inner tube or by a covering material hose, wherein the inner tube comprises at least two coextruded material layers made of a thermoplastic, the at least two coextruded material layers comprising at least an inner material layer and an outer material layer, wherein the thermoplastic of the outer material layer of the inner tube has a lower viscosity than the thermoplastic of the inner material layer of the inner tube.

2. The tube or semi-finished tube according to claim 1, wherein the inner tube and the adhesion-promoting layer are produced from thermoplastics of the same type.

3. The tube or semi-finished tube according to claim 1, wherein the inner tube and/or the adhesion-promoting layer are produced from polyolefins.

4. The tube or semi-finished tube according to claim 1, wherein the adhesion-promoting layer has a three-dimensional textile structure.

5. The tube or semi-finished tube according to claim 1, wherein the textile structure of the adhesion-promoting layer is formed in the manner of a woven, crocheted or knitted fabric.

6. The tube or semi-finished tube according to claim 1, wherein the inner tube and the adhesion-promoting layer are produced from polyolefins of the same type or from fluorinated plastics of the same type.

7. The tube or semi-finished tube according to claim 1, wherein the inner tube and/or the adhesion-promoting layer are produced from polyolefins or from fluorinated plastics.

* * * * *